United States Patent [19]
Cox et al.

[11] Patent Number: 5,924,248
[45] Date of Patent: Jul. 20, 1999

[54] COLLAPSIBLE FRAME DEVICE

[75] Inventors: Richard Dawson Cox, Miami, Fla.; Salmon Pienaar, Port Elizabeth, South Africa

[73] Assignee: Kar-Tainer International Inc., Miami, Fla.

[21] Appl. No.: 08/765,710

[22] PCT Filed: Aug. 1, 1996

[86] PCT No.: PCT/US96/12645

§ 371 Date: Apr. 8, 1997

§ 102(e) Date: Apr. 8, 1997

[87] PCT Pub. No.: WO97/05349

PCT Pub. Date: Feb. 13, 1997

[51] Int. Cl.[6] .................................. E04H 6/04; B60P 3/08
[52] U.S. Cl. ........................... 52/174; 52/646; 52/648.1; 52/653.1; 52/653.2; 52/745.01; 410/4; 410/24; 410/26; 414/228; 414/229
[58] Field of Search .......................... 52/174, 646, 648.1, 52/653.1, 653.2, 745.01; 410/26, 4, 24, 29; 414/228, 229, 462, 498, 608

[56] References Cited

U.S. PATENT DOCUMENTS

| | | |
|---|---|---|
| 362,453 | 5/1887 | Lozier . |
| 982,046 | 1/1911 | Flemming . |
| 1,247,553 | 11/1917 | Lindquist et al. . |
| 1,263,788 | 4/1918 | Michod . |
| 1,276,556 | 8/1918 | Michod . |
| 1,282,766 | 10/1918 | Daly . |
| 1,724,556 | 8/1929 | Blakely . |
| 1,869,054 | 7/1932 | Evans . |
| 1,892,589 | 12/1932 | Snyder . |
| 1,978,287 | 10/1934 | Thomas . |
| 2,016,430 | 10/1935 | Hice . |
| 2,098,184 | 11/1937 | Fehr et al. . |
| 2,492,829 | 12/1949 | Baker . |
| 2,617,368 | 11/1952 | McCormick . |
| 2,838,338 | 6/1958 | Kerley et al. . |
| 2,968,260 | 1/1961 | Scheldrup . |
| 2,969,157 | 1/1961 | Panes . |
| 3,040,917 | 6/1962 | Bonnin . |
| 3,043,454 | 7/1962 | Butler et al. . |
| 3,083,670 | 4/1963 | Harlander et al. . |

(List continued on next page.)

FOREIGN PATENT DOCUMENTS

| | | |
|---|---|---|
| 164626 | 7/1953 | Australia . |
| 961699 | 1/1975 | Canada . |
| 0 468 349 A1 | 1/1992 | European Pat. Off. . |
| 1202387 | 1/1960 | France . |
| 1 135 782 | 8/1962 | Germany . |
| 2 049 653 | 4/1972 | Germany . |
| 46-15524 | 4/1971 | Japan . |
| 46-5854 | 12/1971 | Japan . |
| 56-4584 | 1/1981 | Japan . |
| 57-30310 | 7/1982 | Japan . |
| 61-115744 | 6/1986 | Japan . |
| 62-177690 | 11/1987 | Japan . |
| 62-317656 | 12/1987 | Japan . |
| 63-212140 | 9/1988 | Japan . |
| 7-5052 | 1/1995 | Japan . |
| 41-3964 | 3/1996 | Japan . |
| 88/6868 | 5/1990 | South Africa . |
| 93/0891 | 9/1993 | South Africa . |
| 1006496 | 10/1965 | United Kingdom . |
| 2 050 304 | 1/1981 | United Kingdom . |
| WO 81/01997 | 7/1981 | WIPO . |
| WO 87/06895 | 11/1987 | WIPO . |
| WO 90/11911 | 10/1990 | WIPO . |

*Primary Examiner*—Christopher Kent
*Attorney, Agent, or Firm*—Kenyon & Kenyon

[57] ABSTRACT

A collapsible frame device and method of packing vehicles in a transport container is disclosed. The frame device comprises a base and upper and lower vehicle support members associated with the base for supporting at least two vehicles. In the erected configuration of the device, the vehicle support members are horizontally and vertically spaced from one another. The support members are collapsible onto the base in a substantially flat position.

7 Claims, 10 Drawing Sheets

U.S. PATENT DOCUMENTS

| | | |
|---|---|---|
| 3,147,868 | 9/1964 | Borger et al. . |
| 3,236,400 | 2/1966 | Turturro et al. . |
| 3,260,385 | 7/1966 | King . |
| 3,337,066 | 8/1967 | Reed et al. . |
| 3,445,013 | 5/1969 | Scheinert . |
| 3,468,437 | 9/1969 | Miller . |
| 3,490,622 | 1/1970 | Brackin . |
| 3,498,480 | 3/1970 | Gutridge . |
| 3,511,392 | 5/1970 | Blunden et al. . |
| 3,618,796 | 11/1971 | Peisner . |
| 3,637,095 | 1/1972 | Kampfer . |
| 3,650,416 | 3/1972 | Bodenheimer . |
| 3,667,635 | 6/1972 | Hackney . |
| 3,675,795 | 7/1972 | Dluhy . |
| 4,016,991 | 4/1977 | Oldford . |
| 4,124,119 | 11/1978 | Nordstrom . |
| 4,297,071 | 10/1981 | Dunbar . |
| 4,455,119 | 6/1984 | Smith . |
| 4,592,693 | 6/1986 | Perrot . |
| 4,597,712 | 7/1986 | Smith . |
| 4,624,188 | 11/1986 | Kaleta . |
| 4,668,141 | 5/1987 | Petersen . |
| 4,688,142 | 8/1987 | Hjortsberg et al. . |
| 4,768,916 | 9/1988 | Gearin et al. . |
| 4,797,049 | 1/1989 | Gearin et al. . |
| 4,801,229 | 1/1989 | Hanada et al. . |
| 4,884,935 | 12/1989 | Smith et al. . |
| 4,911,590 | 3/1990 | Green . |
| 4,917,557 | 4/1990 | Kato et al. . |
| 4,919,582 | 4/1990 | Bates et al. . |
| 4,957,407 | 9/1990 | Gearin . |
| 4,963,067 | 10/1990 | Gearin et al. . |
| 5,040,935 | 8/1991 | Gearin et al. . |
| 5,040,938 | 8/1991 | Gearin et al. . |
| 5,044,866 | 9/1991 | Harp ................................ 410/26 X |
| 5,105,951 | 4/1992 | Gearin et al. . |
| 5,106,246 | 4/1992 | Chance . |
| 5,213,458 | 5/1993 | Preller et al. ............................ 410/26 |
| 5,215,424 | 6/1993 | Gearin et al. . |
| 5,253,975 | 10/1993 | Takaguchi . |
| 5,415,505 | 5/1995 | Halpin et al. . |
| 5,417,332 | 5/1995 | Gearin et al. . |
| 5,427,485 | 6/1995 | Henderson et al. ....................... 410/26 |
| 5,445,278 | 8/1995 | Gearin et al. . |
| 5,454,672 | 10/1995 | Halpin et al. . |
| 5,470,490 | 11/1995 | Gearin et al. . |
| 5,478,187 | 12/1995 | Gearin et al. . |
| 5,482,167 | 1/1996 | Gearin et al. . |
| 5,505,581 | 4/1996 | Gearin et al. . |
| 5,547,333 | 8/1996 | Pienaar ................................ 410/26 X |
| 5,553,716 | 9/1996 | Gearin et al. . |
| 5,567,111 | 10/1996 | Gearin et al. ......................... 410/26 X |

COLLAPSIBLE FRAME DEVICE

This invention relates to a collapsible frame device suitable for packing vehicles in a transport container. The invention also relates to a method of packing vehicles in a transport container.

When packing motor vehicles in transport containers such as shipping containers, at least some of the vehicles are usually provided in an inclined position relative to the container floor to allow the maximum amount of vehicles to be fitted into the container.

In order to pack two motor vehicles into a standard six meter shipping container the one vehicle is usually provided in an inclined position in the container with one end thereof located near the floor of the container and the other end provided near the roof of the container. The second vehicle is usually provided in a substantially horizontal position, parallel to the container floor, partly underneath the first vehicle. The same method may also be used to pack for example, four vehicles into a standard twelve meter shipping container.

The frame devices used to pack vehicles in a transport container are usually bulky and take up a lot of space when they have to be transported back after use.

It is accordingly an object of the present invention to provide a frame device suitable for packing vehicles in a transport container which frame device is collapsible allowing it to take up relative little space when transported back after use. The arrangement is preferably such that the frame device can be erected and collapsed with relatively little effort.

According to the present invention there is provided a collapsible frame device suitable for packing vehicles in a transport container having at least a floor and a wall structure, the frame device comprising a base which in use rests on the container floor; a first vehicle support means associated with the base for supporting a first vehicle in an inclined raised position relative to the base, the first vehicle support means comprising a lower vehicle support member and an upper vehicle support member, the support members in use in the erected configuration of the device being horizontally and vertically spaced from each other in order that the lower vehicle support member is relatively close to the base and that the upper vehicle support member is relatively high from the base; the lower and upper vehicle support members being collapsible onto the base to be located substantially flat onto the base in the collapsed configuration of the device; the arrangement being such that in the erected configuration of the device the device provides a space to receive a second vehicle at least partly beneath the first vehicle support means.

In this specification the term "vehicle" may in addition to its normal meaning also include a vehicle in semi knock-down form or a partly assembled vehicle.

The first vehicle support means may also include a ramp means releasably connectable to the upper and lower vehicle support members to support the first vehicle thereon in an inclined raised position in the erected configuration of the device. This vehicle will normally comprise a wheeled vehicle.

Alternatively, mounting brackets may be provided to mount a vehicle in semi-knock down form or in a partly assembled form to the lower and upper vehicle support members.

The base may comprise a generally rectangularly shaped configuration defining two opposing long sides and two opposing short ends. The base may be in the form of a frame.

The base may be provided with a number of wheels or rollers or the like whereupon the base in use slides.

The lower and upper vehicle support members may each comprise a cross-bar which in use extends transversely across the base from one side to the other side; and two substantially upright members which in the erected configuration of the device extend upright from the base on opposite sides thereof in use to engage the cross-bar towards opposite ends thereof thereby in use supporting the cross-bar in an elevated position from the base.

Each cross-bar may be releasably secured to the upright members. Preferably each cross-bar includes two projections which project transversely therefrom and which projections are telescopically associated with the upright members to connect them to each other.

An upright member from the lower support member and an upright member from the upper support member located on one side of the base may be connected to each other via a connecting member extending transversely between the said upright members preferably along the base of the device. The upright members may in the erected configuration of the device be connected to the base via the upright connecting member.

In an alternative embodiment of the invention an upright member from the lower support member and an upright member from the upper support member located on one side of the base may be separate from each other. The distance between them may be adjustable.

The upper and lower vehicle support members may be collapsible onto the base by folding them onto the base.

In a preferred embodiment of the invention the two substantially upright members of each support member are folded towards each other onto the base. Preferably, the two substantially upright members of each support member are folded towards each other folding along lines extending along or parallel to the opposing long sides of the base where the base comprises a generally rectangular configuration defining two opposing long sides and two opposing short ends.

The upright members of the support members may be hingedly attached to the base.

The ramp means may comprise a pair of ramp members each ramp member comprising an elongate member which in the erected configuration of the device is releasably attachable to the upper and lower vehicle support members.

The ramp means may be adapted in use to allow a vehicle to be driven thereon in the erected configuration of the device.

The frame device may also include a second vehicle support means for supporting a second vehicle on the base in the space provided at least partly below the ramp means in the erected configuration of the device.

The second vehicle support means may comprise a pair of tracks secured or securable to the base.

The second vehicle support means in use preferably supports the second vehicle in position generally parallel to the base.

According to another aspect of the present invention there is provided a collapsible frame device suitable for packing vehicles in a transport container having at least a floor and a wall structure, the frame device comprising an elongate base defining two opposing long sides, which base in use rests on the container floor; a first vehicle support means associated with the base for supporting a first vehicle in an inclined raised position relative to the base, the first vehicle support means comprising a lower vehicle support member and an upper vehicle support member, the support members in use in the erected configuration of the device being horizontally and vertically spaced from each other in order that the lower vehicle support member is relatively close to the base and that the upper vehicle support member is relatively high from the base; the lower and upper vehicle support members being collapsible onto the base in the collapsed configuration of the device by folding them onto the base along two lines each line extending along or parallel to a long side of the base; the arrangement being such that in the erected configuration of the device the device provides a space to receive a second vehicle at least partly beneath the first vehicle support means.

The first vehicle support means may also include a ramp means connected or connectable to the upper and lower vehicle support members to support the first vehicle thereon in an inclined raised position in the erected configuration of the device.

The invention also relates to the use of a frame device as described hereinabove for packing vehicles in a transport container.

According to another aspect of the present invention there is provided a method of packing vehicles in a transport container comprising the steps of:
  providing a frame device as described hereinabove in an erected configuration at least partly outside a transport container;
  providing two vehicles on the frame device, one vehicle on the first vehicle support means and the other on the base at least partly beneath the first vehicle support means; and
  moving the frame device with the vehicles thereon into the container.

The one vehicle may be driven onto the ramp means and preferably the other vehicle is also driven onto the frame device.

Without thereby limiting the scope of the invention and by means of example only, embodiments of the invention will now be described with reference to the accompanying drawings wherein.

In the accompanying drawings the same reference numerals are used to denote corresponding parts.

Figure 1:
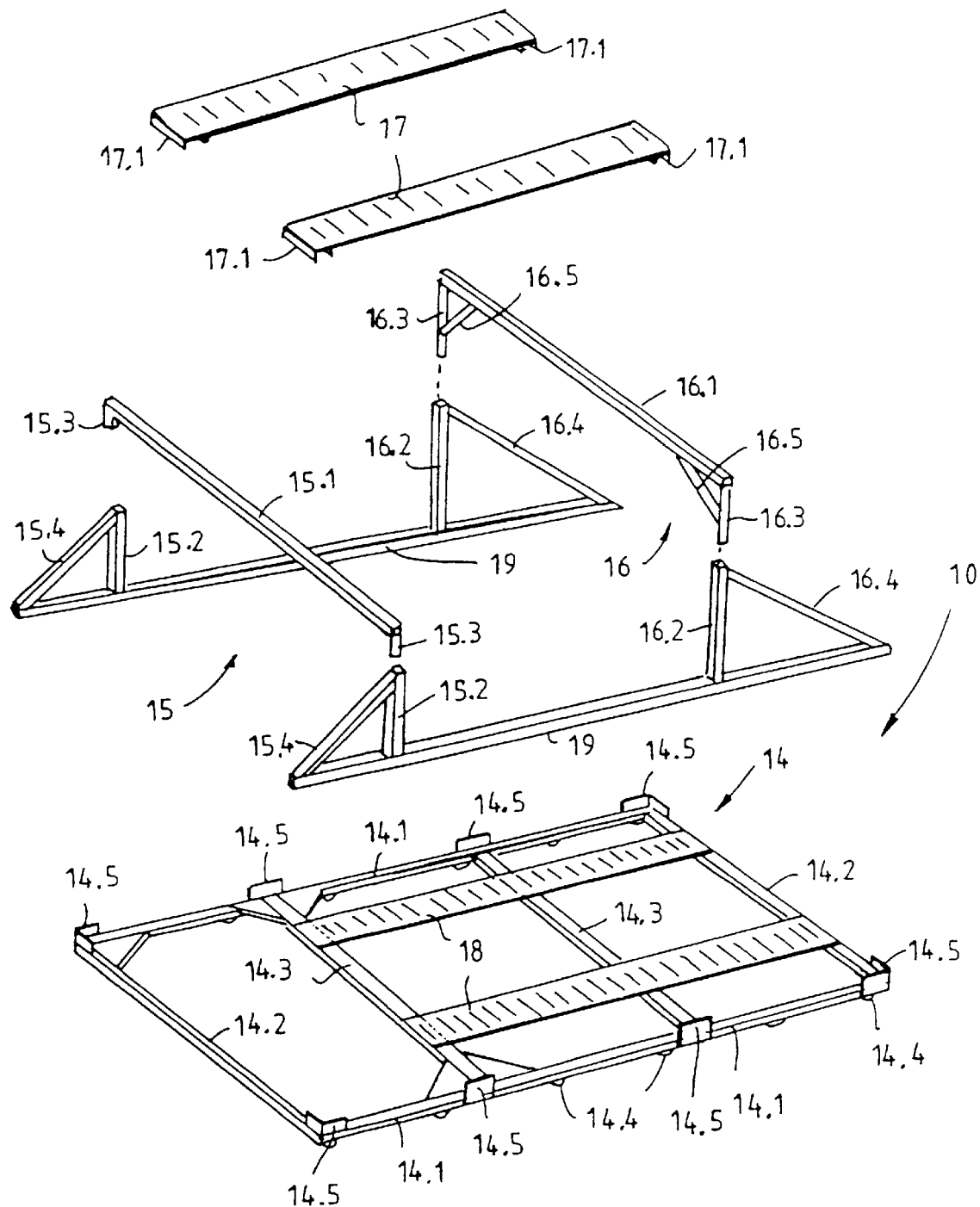
FIG. 1 is an exploded perspective view of the frame device according to the invention.
Figure 2:
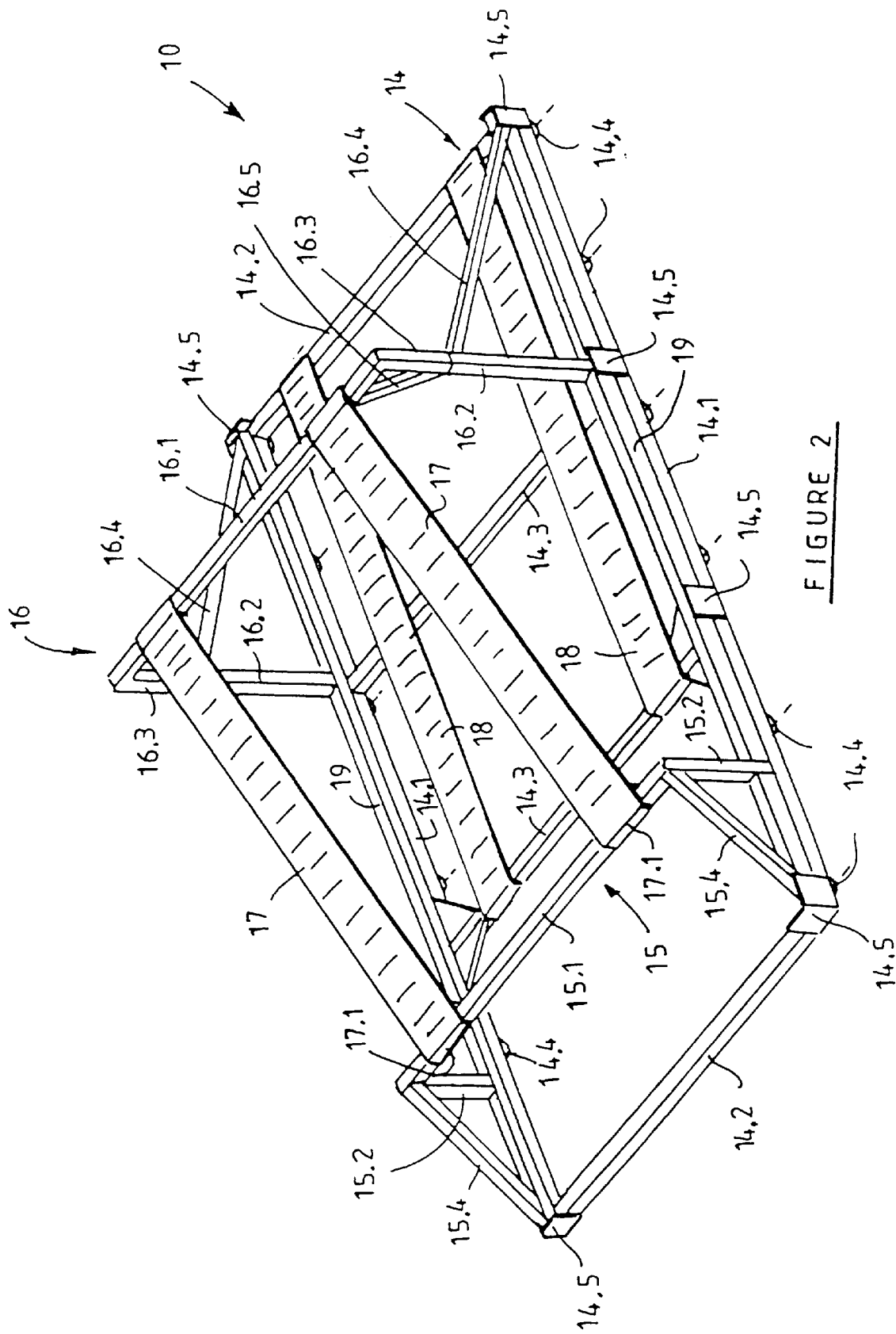
FIG. 2 is a perspective view of the frame device of FIG. 1 in its erected and assembled configuration.
Figure 3:
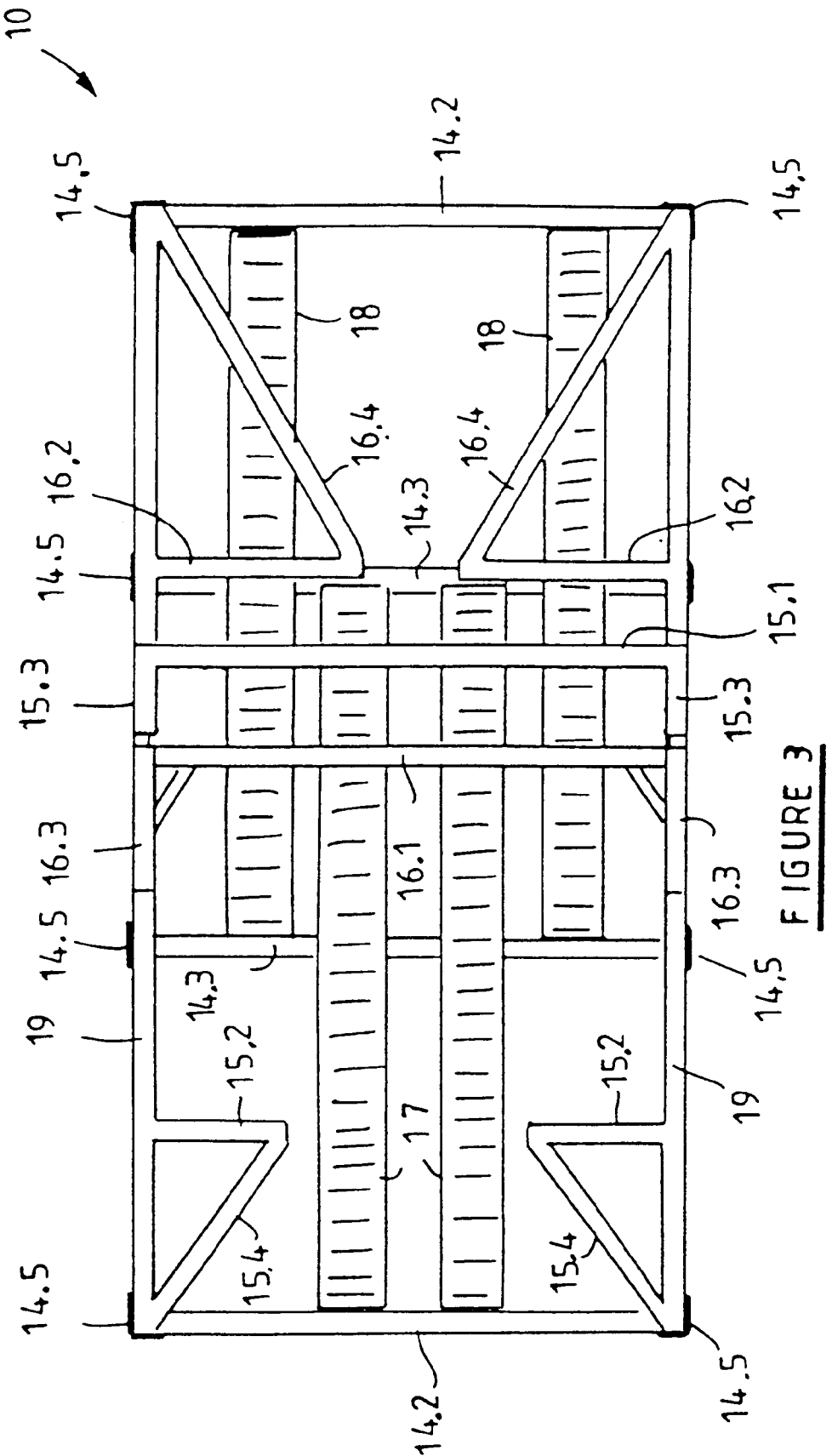
FIG. 3 is a plan view of the device of FIG. 1 in its collapsed configuration.

Referring now to FIGS. 1 to 6 there is provided a collapsible frame device 10 suitable for packing vehicles 11 and 12 into a transport container 13. The container 13 comprises a floor 13.1, a wall 13.2 a roof 13.3 and an opening 13.4 which is closeable by means of a door or the like.

The frame device 10 comprises a base 14 which in use rests on the container floor 13.1. A first vehicle support means associated with the base 14 is provided for supporting a first vehicle 11 in an inclined raised position relative to the base 14 is also provided. The first vehicle support means comprises a lower vehicle support member 15 and an upper vehicle support member 16, the members in use in the erected configuration of the device 10 [FIG. 2] being horizontally and vertically spaced from each other. The lower vehicle support member 15 is relatively close to the base 14 and the upper vehicle support member 16 is relatively high from the base 14 and in use they support a vehicle towards opposite ends of the vehicle to provide it in an inclined raised position. The support members 15 and 16 are also collapsible onto the base to be located substantially flat onto the base in the collapsed configuration of the device 10 [FIG. 3]. A ramp means in the form of a pair of ramp members 17 are releasably connectable to the upper and lower vehicle support members 15 and 16 respectively to extend between them. A second vehicle support means 18 is also provided for supporting a second vehicle 12 in a horizontal position relative to the base 14 in a space provided by the device 10 partly beneath the ramp members 17 and the first vehicle 11.

The base 14 comprises a generally rectangularly shaped frame. The frame comprises two opposing long side members 14.1 and two opposing short end members 14.2 extending between the long side members 14.1.

Additional cross members 14.3 are provided to extend between the side members 14.1. The base 14 is adapted in use to fit into a standard six meter shipping container 13.

The base 14 is further provided with a number of wheels 14.4 whereupon the base 14 in use rides. Locating formations 14.5 are also provided on the base 14 to enhance positioning of the upper and lower support members 15 and 16 onto the base 14.

The lower support member 15 comprises a cross-bar 15.1 which in use extends across the base 14, from one side member 14.1 to the other, and two substantially upright members 15.2 extending upright from the base 14 on opposite sides thereof in the erected configuration of the device 10, that is upright from opposite side members 14.1 of the base 14. In the erected configuration of the device 10 the upright members 15.2 engage the cross-bar 15.1 on opposite ends thereof to support it in an elevated position relative to the base 14. The cross-bar 15.1 includes two projections 15.3 projecting transversely therefrom, which projections 15.3 are telescopically associated with the upright members 15.2 to connect them releasably to each other. Two braces 15.4 support the upright members 15.2.

The upper support member 16 also comprises a cross-bar 16.1, two upright members 16.2, two projections 16.3 and braces 16.4 and the arrangement is the same as described for the lower support member 15. In addition braces 16.5 are provided to provide strength to the cross-bar 16.1.

Each pair of upright members 15.2 and 16.2 located on one side of the base 14 are connected to each other via a connecting member 19 extending transversely between the said two upright members 15.2 and 16.2. In the erected configuration of the device the upright members 15.2 and 16.2 are connected to the base 14 via the connecting member 19.

The ramp members 17 are releasably secured to the vehicle support members 15 and 16. Channel members 17.1 provided at opposite sides of each ramp member 17, which channel members 17.1 in use hook over the cross-bars 15.1 and 16.1 respectively.

The second vehicle support means 18 comprises a pair of tracks secured to the base 14.

Figure 4:
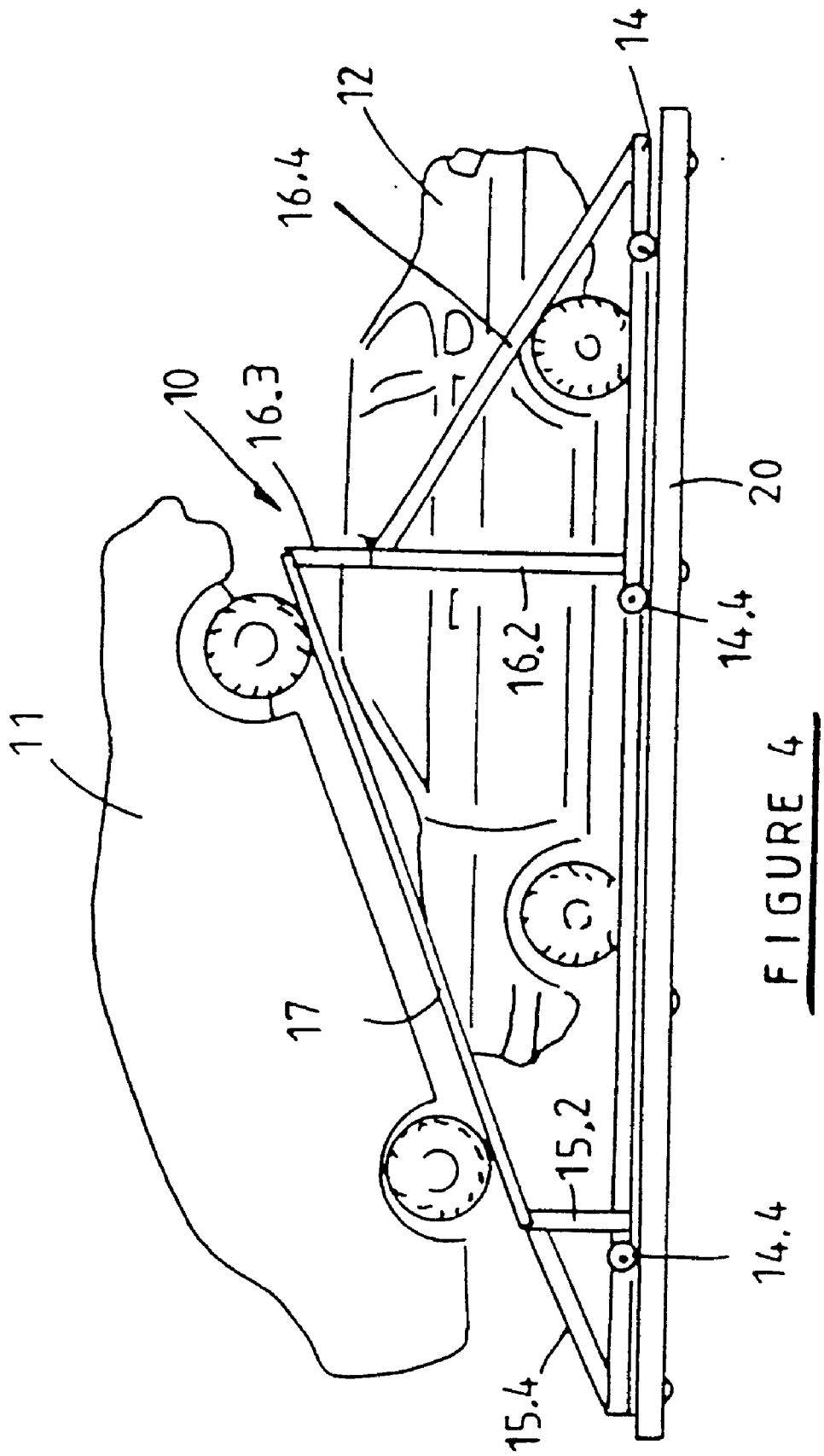
FIG. 4 is a diagrammatic side view of two vehicles loaded onto the device of FIG. 2.

In use two fully built-up vehicles 11 and 12 may be provided on the device as shown in FIG. 4 outside of the container. The first vehicle 11 may be driven onto the ramp members 17, by providing a pair of additional ramp members [not shown] to extend from the ends of the ramp members 17 supported on the cross-bar 15.1, to the ground level. After driving the vehicle 11 onto the ramp members 17 the additional ramp members may be removed. The second vehicle 12 may also be driven onto the tracks 18. Either the vehicle 11 or the vehicle 12 may be provided first onto the device 10.

Figure 5:
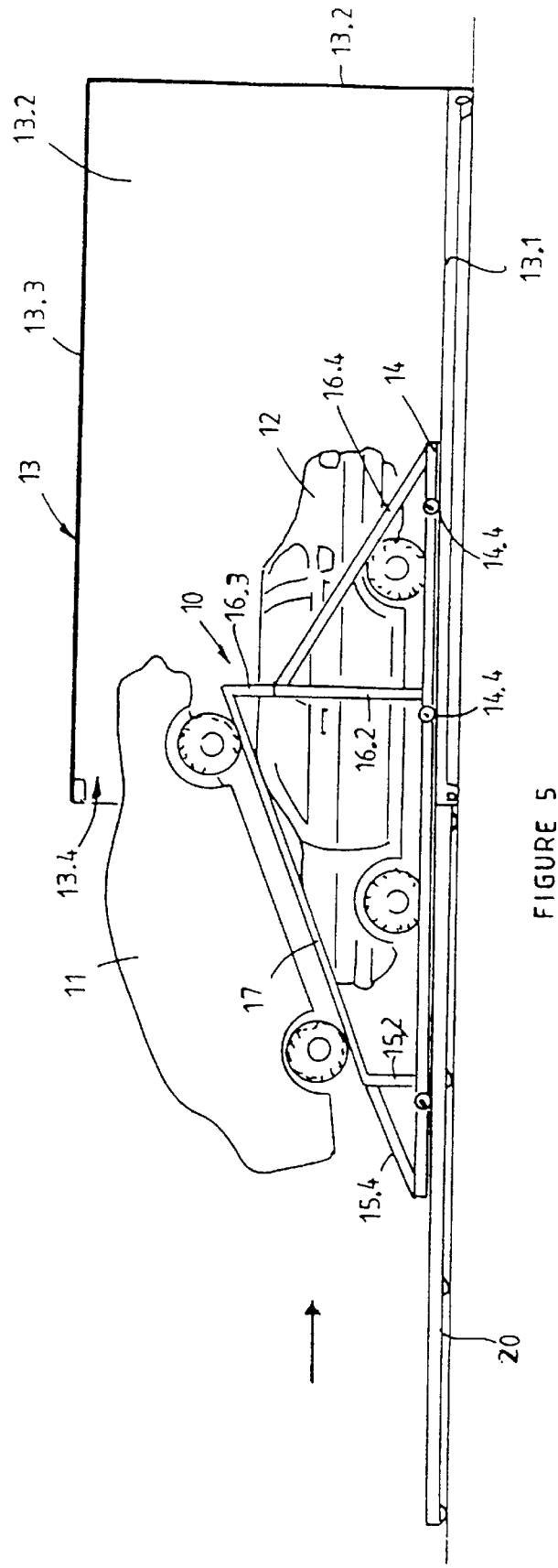
FIG. 5 is a diagrammatic side view of the arrangement of FIG. 4 being loaded into a container.
Figure 6:
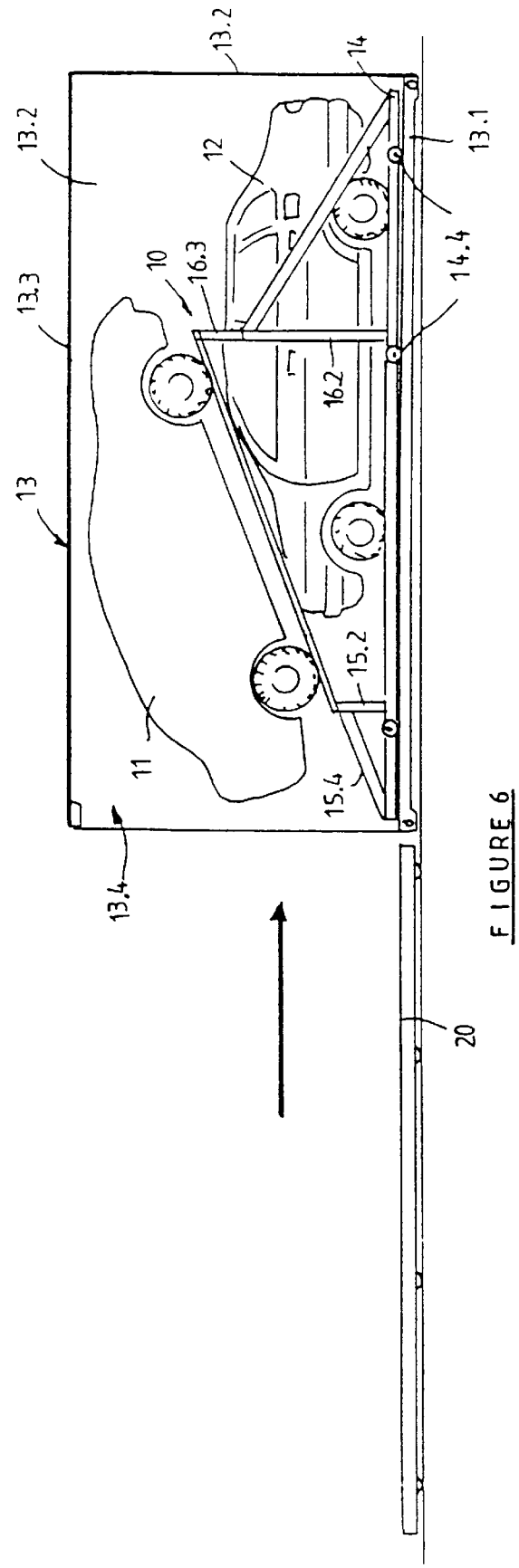
FIG. 6 is a diagrammatic side view of the arrangement of FIG. 4 loaded into a container.

The device 10 may be provided on a trolley 20 (or alternatively a pallet) which is then pushed against a transport container 13 as shown in FIG. 5. The device 10 with vehicles 11 and 12 are then pushed to slide on its wheels 14.4 into the container 13 as shown in FIG. 6.

Alternatively the device 10 with vehicles 11 and 12 thereon may be provided directly on a support surface and the container floor 13.1 may be provided on the same level as the support surface. The ramp device 10 may then be slid into the container 13.

In stead of the fully built-up vehicles 11 and 12, semi-knock down vehicles [not shown] may be secured onto the device 10. In such a case the ramps 17 are removed and mounting means [not shown] is provided to mount the first vehicle body onto the cross-bars 15.1 and 16.1.

To collapse the device 10 the cross-bars 15.1 and 16.1 are removed from the upright members 15.2 and 16.2 respectively and placed onto the base 14 as shown in FIG. 4. The upright members 15.2 and 16.2 are then folded onto the base towards each other as shown in FIG. 4 by rotating them about the connecting members 19. In use a number of collapsed devices 10 may be stacked onto each other. In this way a number of collapsed devices 10 can be transported in a single container to reduce transport costs.

Referring now to FIGS. 7 to 11, an alternative collapsible frame device 70 is provided which operates basically the same as the device 10.

The frame device 70 comprises a base 71 and a first vehicle support means associated with the base 71 for supporting a first vehicle [not shown] in a inclined raised position relative to the base 71. The first vehicle support means comprises a lower vehicle support member 72 and an upper vehicle support member 73, the members in use in the erected configuration of the device 70 [FIG. 8] being horizontally and vertically spaced from each other. The lower vehicle support member 72 is relatively close to the base 71 and the upper vehicle support member 73 is relatively high form the base 71. The support members 72 and 73 are also collapsible onto the base 71 to be located substantially flat onto the base 71 in the collapsed configuration of the device 70 [not shown]. A ramp means in the form of a pair of ramp members 74 are releasably connectable to the upper and lower vehicle support members 72 and 73 respectively. A second vehicle support means 75 in the form of a pair of tracks 75 is also provided for supporting a second vehicle [not shown] on the base 71 in a horizontal position relative thereto in a space provided by the device 70 partly beneath the ramp members 74 and the first vehicle [not shown] supported thereon.

Figure 10:
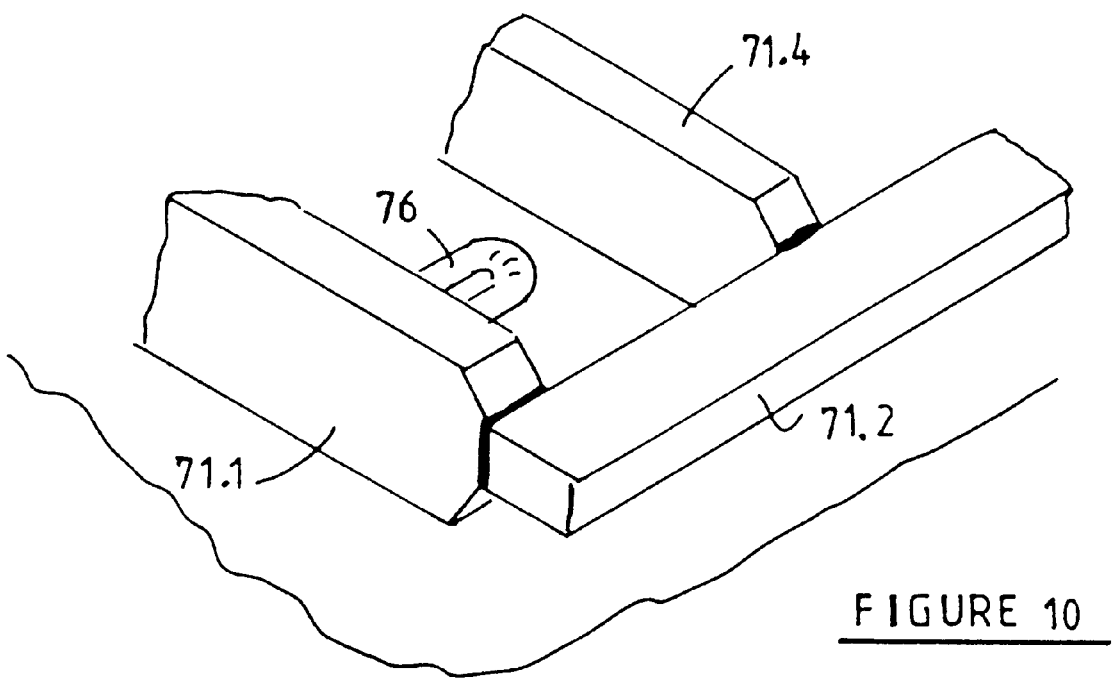
FIG. 10 is a perspective view of part of one end of the base of the device of FIG. 7.

The base 71 comprises a generally rectangular shaped frame which is longitudinally receivable in a shipping container [not shown]. The base 71 comprises two opposing long side members 71.1 and two opposing short end members 71.2 and 71.3 respectively extending between the long side members 71.1. Additional elongate members 71.4 are provided whereto the tracks 75 are mounted. Additional short members 71.5 extend between the inner additional elongate member 71.4. Attachment members 71.6 extend between the outer additional elongate member 71.4 and the long side members 71.1. The members 71.2, 71.5 and 71.6 are provided slightly raised from a support surface whereupon the members 71.1 and 71.4 in use rests to reduce friction when the base 71 is in use slid on a support surface in a direction along the members 71.1 and 71.4. FIG. 10 shows the attachment for the short end member 71.2 to the members 71.1 and 71.4 [In this embodiment of the invention the base 71 is not provided with wheels].

The base 71 also includes engagement formations 71.7 in the form of tubular members engageable by an apparatus such as a fork-lift to lift the unloaded device 70, for example, when stacking after use. A support 71.8 is provided between the engagement formations 71.7.

Figure 7:
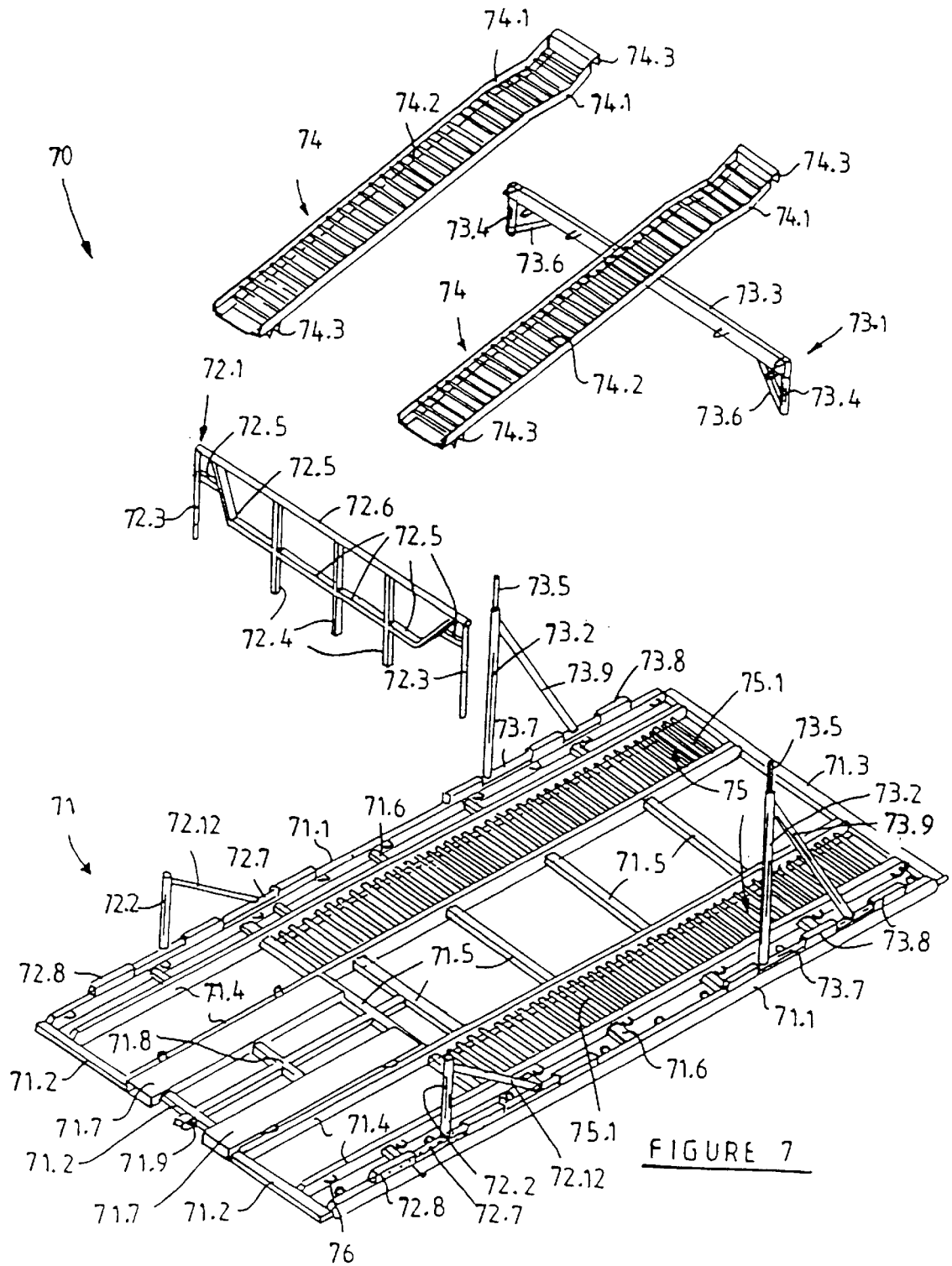
FIG. 7 is an exploded perspective view of an alternative frame device according to the invention.
Figure 8:
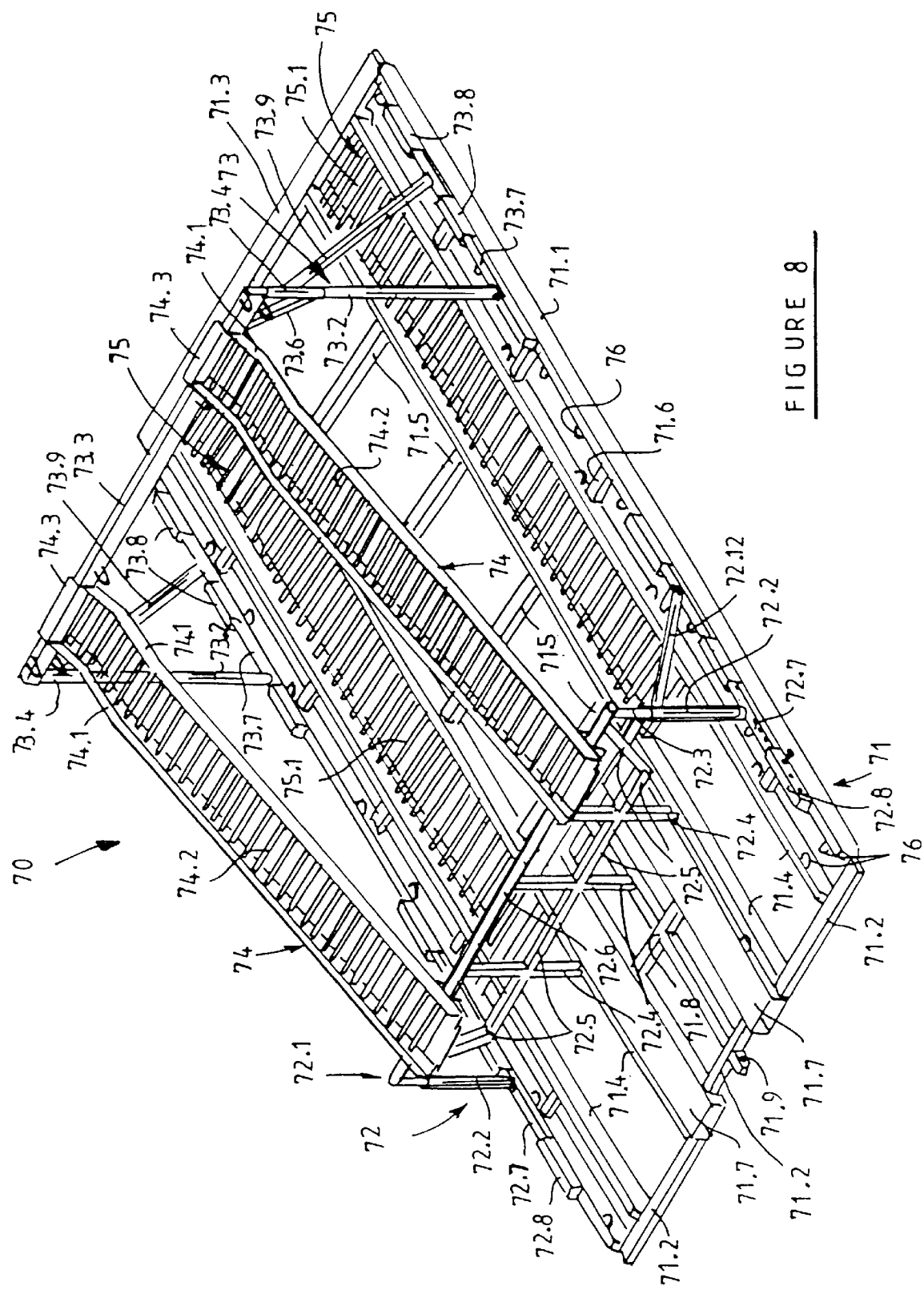
FIG. 8 is a perspective view of the frame device of FIG. 7 in its erected and assembled configuration.
Figure 11:
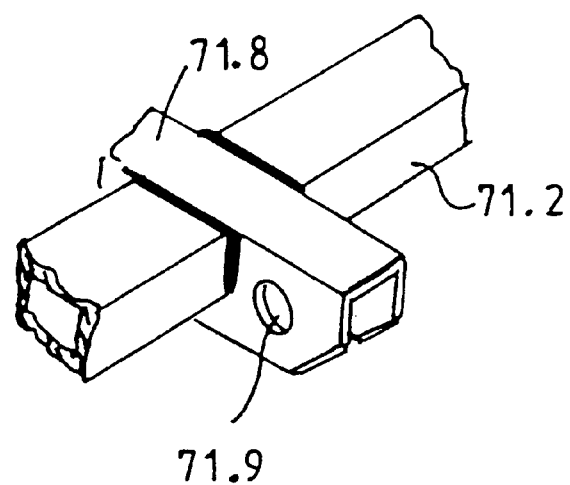
FIG. 11 is a perspective view of an attachment formation on the device of FIG. 7.

An attachment formation 71.9 [FIGS. 7 and 11] in the form of an eye formation is provided on the short end member 71.2. In use the eye formation 71.9 may be used to engage the device 70 when for example pulling it out of a shipping container. For example, a shackle or the like attached to a cable may be provided through the eye formation 71.9 and the cable may then be pulled to pull the device 70 out of the container.

The lower support member 72 comprises a cross-member 72.1 which in use extends across the base 71 from the one long side member 71.1 to the other. Two substantially upright members 72.2 extend upright from the base 71 on opposite sides thereof in the erected configuration of the device 70, that is upright from opposite side members 71.1 of the base 71. In the erected configuration of the device 70, the upright members 72.2 engage the cross-member 72.1 on opposite ends thereof to support it in an elevated position relative to the base 71.

The cross-member 72.1 includes a cross-bar 72.6 and two projections 72.3 projecting transversely therefrom, which projections 72.3 are telescopically associated with the upright members 72.2 to slide into them thereby to connect them releasably to each other. The cross-member 72.1 further includes three leg members 72.4 which in the erected configuration of the device 70 rests on the base 71 to provide stability to the lower support member 72. Additional stabilizing members 72.5 are also provided on the cross-members 72.1.

Figure 9:
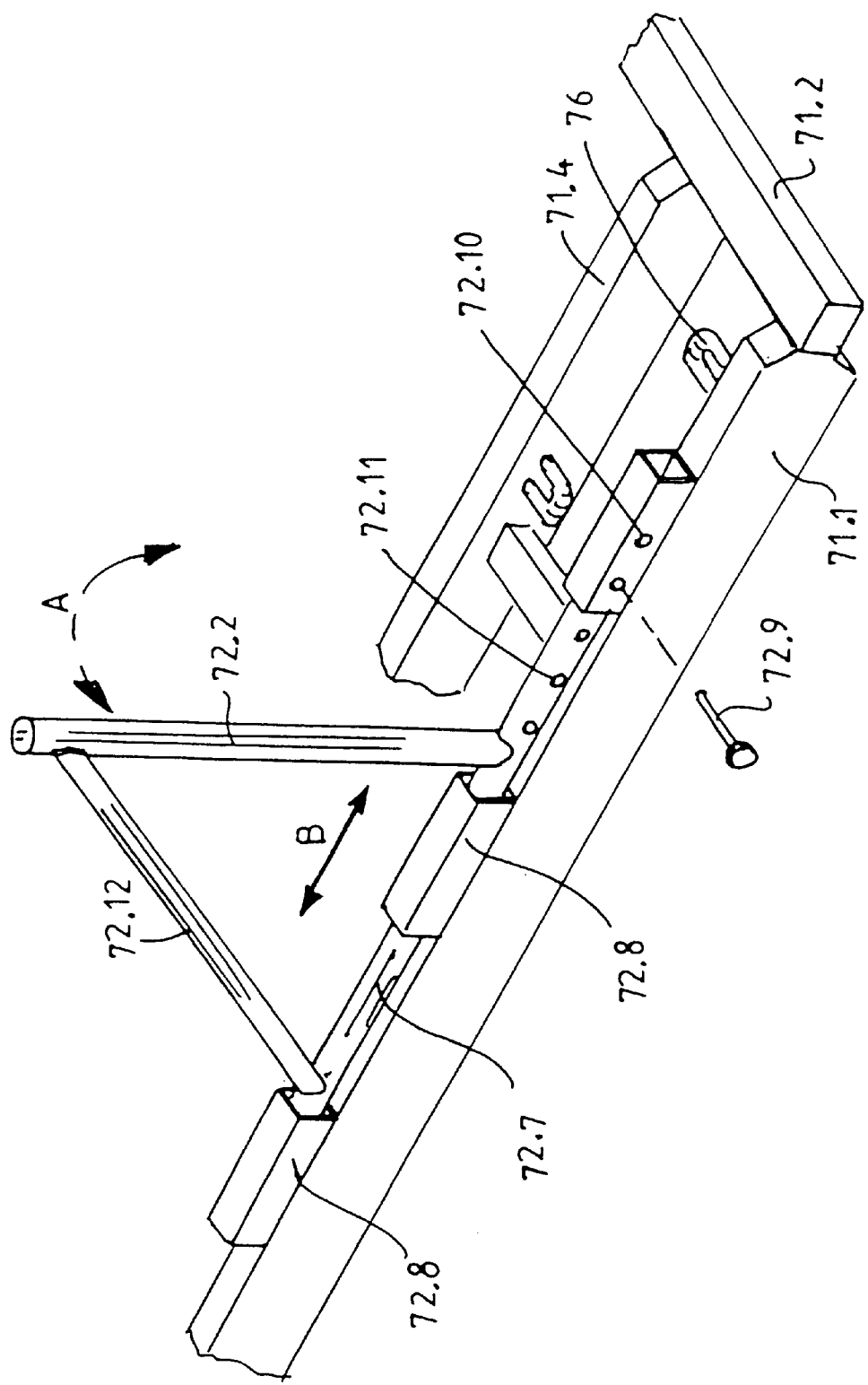
FIG. 9 is a perspective view of an upright member of the lower vehicle support member of the device of FIG. 8.

Each upright member 72.2 is mounted on a base member 72.7 [FIG. 9]. The base member 72.7 extends through tubular members 72.8 thereby hingedly attaching the upright member 72.2 on the base 71 allowing the upright member 72.2 to be provided in an upright position as shown in FIG. 9 or to fold down onto the base 71 by folding along a line extending longitudinally through the base member 72.7. The folding action is indicated by arrow A. The base member may also slide to and fro through the tubular members 72.8 as indicated by the arrow B to allow the distance between the lower support member 72 and the upper support member 73 to be adjusted. A locking means in the form of a locking pin 72.9 in use received through apertures 72.10 provided in a tubular members 72.8 and apertures 72.11 provided in the base member 72.7 is provided to arrest the base member 72.7 from sliding through the tubular members 72.8 in the direction of arrow B. Each upright member 72.2 is also provided with a brace 72.12 extending from the base member 72.7 to the upright member 72.2.

The upper support member 73 is similar in construction and operation as the tower support member 72 and also includes a cross-member 73.1 and two substantially upright members 73.2. The cross member 73.1 includes a cross-bar 73.3 and two projections 73.4 for in use receiving therein spigots 73.5 on the upright members 73.2 to releasably connect the cross-member 73.1 to the upright members 73.2. Braces 73.6 extend between each projection 73.4 and the cross-bar 73.3.

Each upright member 73.2 is also mounted on a base member 73.7 which is hingedly and slidingly attached to the base 71 via tubular members 73.8 in a similar manner as described for the lower support member 72. However, in this case no locking pin and holes are provided. Each upright member 73.2 also includes a brace 73.9.

Each ramp member 74 comprises two angle-iron members 74.1 with cross-bars 74.2 extending between them. Each ramp member 74 also includes channel members 74.3 on opposite sides thereof which in use hook over the cross-bars 72.6 and 73.3 respectively to releasably secure the ramp member 74 to the vehicle support members 72 and 73.

Each track 75 on the base 71 comprises of cross-bars 75.1 extending between the members 71.4.

Additional ramp members [not shown] may, in the erected configuration of the device 70, be attached to the lower ends of the ramp members 74 to allow a vehicle to be driven up onto the ramp members 74.

The device 70 may be used in a similar way as the device 10 to load vehicles into a transport container.

Eye formations 76 are provided on the device 70 for securing the vehicles [not shown] to the ramp device 70.

To collapse the device 70, the ramp members 74 are removed and thereafter the cross-members 72.1 and 73.1. The upright members 72.2 and 73.2 are then folded onto the base.

It will be appreciated that many variations in detail are possible without thereby departing from the scope and spirit of the invention.

What is claimed is:

1. A collapsible frame apparatus suitable for packing vehicles in a transport container, comprising:
    a) a rectangular base capable of supporting at least two vehicles;
    b) a collapsible lower support member which in the upright position comprises two substantially upright members and a cross-bar which extends transversely across the base;
    c) a collapsible upper support member which in the upright position is connected to the base and extends vertically higher than the lower support member, the upper support member comprising two substantially upright members and a cross-bar which extends transversely across the base;
    d) a first pair of ramps connected between the upper and lower support members such that the ramps support a first vehicle in an inclined raised position relative to the base;
    e) a second pair of ramps attached to the base to support a second vehicle in a position parallel to the base and at least partially beneath the first vehicle; and
    f) the lower and upper support members being collapsible onto the base into a substantially flat position.

2. An apparatus according to claim 1 wherein the first pair of ramps is detachably connected to the upper and lower support members.

3. An apparatus according to claim 1 wherein at least one upright member is hingedly connected with the base.

4. An apparatus according to claim 2, further comprising wheels cooperating with the base such that the base can be rolled into and out of a transportation container.

5. A collapsible frame apparatus suitable for packing vehicles in a transport container, comprising:
    a) a rectangular base;
    b) a lower support member connected to the base comprising a cross-bar which extends transversely across the base and which is telescopically associated with two substantially upright members hingedly connected with the base to support the cross-bar in a position elevated from the base;
    c) an upper support member connected to the base and extending vertically higher than the lower support member, the upper support member comprising a cross-bar which extends transversely across the base and which is telescopically associated with two substantially upright members hingedly connected with the base, to support the cross-bar in a position elevated from the base;
    d) a first pair of ramps detachably connected between the upper and lower support members such that the ramps support a first vehicle in an inclined raised position relative to the base;
    e) a second pair of ramps attached to the base to support a second vehicle in a position parallel to the base and at least partially beneath the first vehicle; and
    f) the lower and upper support members being collapsible onto the base into a substantially flat position.

6. A method for loading vehicles into a container for transportation, comprising:
    a) providing a collapsible apparatus for supporting at least two vehicles, comprising:
        (i) a base capable of supporting at least two vehicles, having wheels thereon;
        (ii) a collapsible lower support member which in the upright position comprises two substantially upright members and a cross-bar which extends transversely across the base;
        (iii) a collapsible upper support member which in the upright position is connected to the base and extends vertically higher than the lower support member, the upper support member comprising two substantially upright members and a cross-bar which extends transversely across the base;
        (iv) a first pair of ramps connected between the upper and lower support members such that the ramps support a first vehicle in an inclined raised position relative to the base;
        (v) a second pair of ramps attached to the base to support a second vehicle in a position parallel to the base and at least partially beneath the first vehicle; and
        (vi) the lower and upper support members being collapsible onto the base into a substantially flat position;
    (b) wheeling a first vehicle into an inclined position on the upper support member;
    (c) wheeling a second vehicle onto the lower support member; and
    (d) transporting the base containing the first and second vehicles into a transport container.

7. A method according to claim 6 wherein the collapsible apparatus is assembled from a collapsed position by:
    (a) raising two pairs of upright members hingedly connected to the base, from a position substantially parallel to the base to a position substantially perpendicular to the base;
    (b) connecting the cross-bars to each pair of the upright members to form the upper and lower support members;
    (c) connecting the first pair of ramps to the upper and lower support members, in an inclined position and at a transverse distance which will support the wheels of a vehicle.

* * * * *